United States Patent
Russell

(10) Patent No.: US 10,949,178 B1
(45) Date of Patent: Mar. 16, 2021

(54) METHOD AND SYSTEM FOR DECOMPOSING A GLOBAL APPLICATION PROGRAMMING INTERFACE (API) GRAPH INTO AN APPLICATION-SPECIFIC API SUBGRAPH

(71) Applicant: INTUIT INC., Mountain View, CA (US)

(72) Inventor: Philip Edward Russell, San Diego, CA (US)

(73) Assignee: INTUIT INC., Mountain View, CA (US)

(*) Notice: Subject to any disclaimer, the term of this patent is extended or adjusted under 35 U.S.C. 154(b) by 0 days.

(21) Appl. No.: 16/714,145

(22) Filed: Dec. 13, 2019

(51) Int. Cl.
G06F 9/44 (2018.01)
G06F 8/41 (2018.01)
G06F 8/60 (2018.01)

(52) U.S. Cl.
CPC .............. G06F 8/427 (2013.01); G06F 8/447 (2013.01); G06F 8/60 (2013.01)

(58) Field of Classification Search
None
See application file for complete search history.

(56) References Cited

U.S. PATENT DOCUMENTS

| | | | | |
|---|---|---|---|---|
| 2016/0110434 A1* | 4/2016 | Kakaraddi | .......... | G06F 11/3006 707/602 |
| 2019/0146970 A1* | 5/2019 | Chamieh | ............... | G06F 16/284 707/718 |
| 2019/0370407 A1* | 12/2019 | Dickie | ................... | G06F 8/443 |

* cited by examiner

*Primary Examiner* — Qamrun Nahar
(74) *Attorney, Agent, or Firm* — Patterson + Sheridan, LLP

(57) ABSTRACT

Certain aspects of the present disclosure provide techniques for generating application programming interface (API) code for an application. The method generally includes receiving information indicating a set of queries invoked within an application. A set of nodes in a graph projection of the API accessed by queries in the set of queries is identified by traversing the graph projection of the API for each query in the set of queries. A subgraph projection of the API including the identified set of nodes is identified, and code implementing operations associated with the identified set of nodes is generated from the generated subgraph projection of the API. The generated code is deployed for use with the application.

20 Claims, 5 Drawing Sheets

METHOD AND SYSTEM FOR DECOMPOSING A GLOBAL APPLICATION PROGRAMMING INTERFACE (API) GRAPH INTO AN APPLICATION-SPECIFIC API SUBGRAPH

INTRODUCTION

Aspects of the present disclosure relate to defining application programming interfaces (APIs) using graph projections, and more specifically to generating application-specific API subgraph projections from a global API graph projection and application usage of functions defined within an API.

BACKGROUND

Application programming interfaces (APIs) generally expose various routines and methods to software developers for use in obtaining and modifying data using features of a software application. These APIs may be accessible programmatically (e.g., as function calls programmed in an application or function library) or via a web resource for web-based applications. Web-based applications can invoke functionality exposed by an API, for example, using a Representational State Transfer function call (a RESTful function call). A RESTful call generally uses HTTP requests to invoke a function exposed by a web-based API and provide data to the invoked function for processing. In other cases, web-based applications can invoke API functions using queries encapsulated in an HTTP POST request, a Simple Object Access Protocol (SOAP) request, or other protocols that allow client software to invoke functions on a remote system.

Some APIs are implemented for software architectures where applications are structured as a collection of services or microservices. Generally, these APIs are built as a monolithic construct including information defining any function exposed by any service in the collection of services and any data object used by any function of any service in the collection of services. The monolithic construct may be deployed to various services and applications that use a portion of the API. In some cases, deploying the monolithic construct may entail compiling the API prior to deploying an application or in a just-in-time manner, where code is compiled during execution of the application. Regardless of how the code implementing the API is generated and compiled, compiling an API for an application may consume significant computing resources. Further, because applications may not use all the features exposed within the API, compiling an API including features not used by an application may unnecessarily consume processing resources during compilation and storage space after compilation.

Accordingly, techniques are needed to generate and deploy code implementing an API that reduces the use processing and storage resources.

BRIEF SUMMARY

Certain embodiments provide a computer-implemented method for generating application programming interface (API) code for an application. The method generally includes receiving information indicating a set of queries invoked within an application. A set of nodes in a graph projection of the API accessed by queries in the set of queries is identified by traversing the graph projection of the API for each query in the set of queries. A subgraph projection of the API including the identified set of nodes is identified and edges connecting the identified set of nodes discovered by traversing the graph projection of the API for each query in the set of queries, and code implementing operations associated with the identified set of nodes is generated from the generated subgraph projection of the API. The generated code is deployed for use with the application.

Other embodiments provide a system comprising a processor and a non-transitory computer-readable memory storing instructions that, when executed by the processor, perform an operation for generating application programming interface (API) code for an application. The operation generally includes receiving information indicating a set of queries invoked within an application. A set of nodes in a graph projection of the API accessed by queries in the set of queries is identified by traversing the graph projection of the API for each query in the set of queries. A subgraph projection of the API including the identified set of nodes is identified and edges connecting the identified set of nodes discovered by traversing the graph projection of the API for each query in the set of queries, and code implementing operations associated with the identified set of nodes is generated from the generated subgraph projection of the API. The generated code is deployed for use with the application.

Still further embodiments provide a computer-readable medium having instructions stored thereon which, when executed, performs an operation for generating application programming interface (API) code for an application. The operation generally includes receiving information indicating a set of queries invoked within an application. A set of nodes in a graph projection of the API accessed by queries in the set of queries is identified by traversing the graph projection of the API for each query in the set of queries. A subgraph projection of the API including the identified set of nodes is identified and edges connecting the identified set of nodes discovered by traversing the graph projection of the API for each query in the set of queries, and code implementing operations associated with the identified set of nodes is generated from the generated subgraph projection of the API. The generated code is deployed for use with the application.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
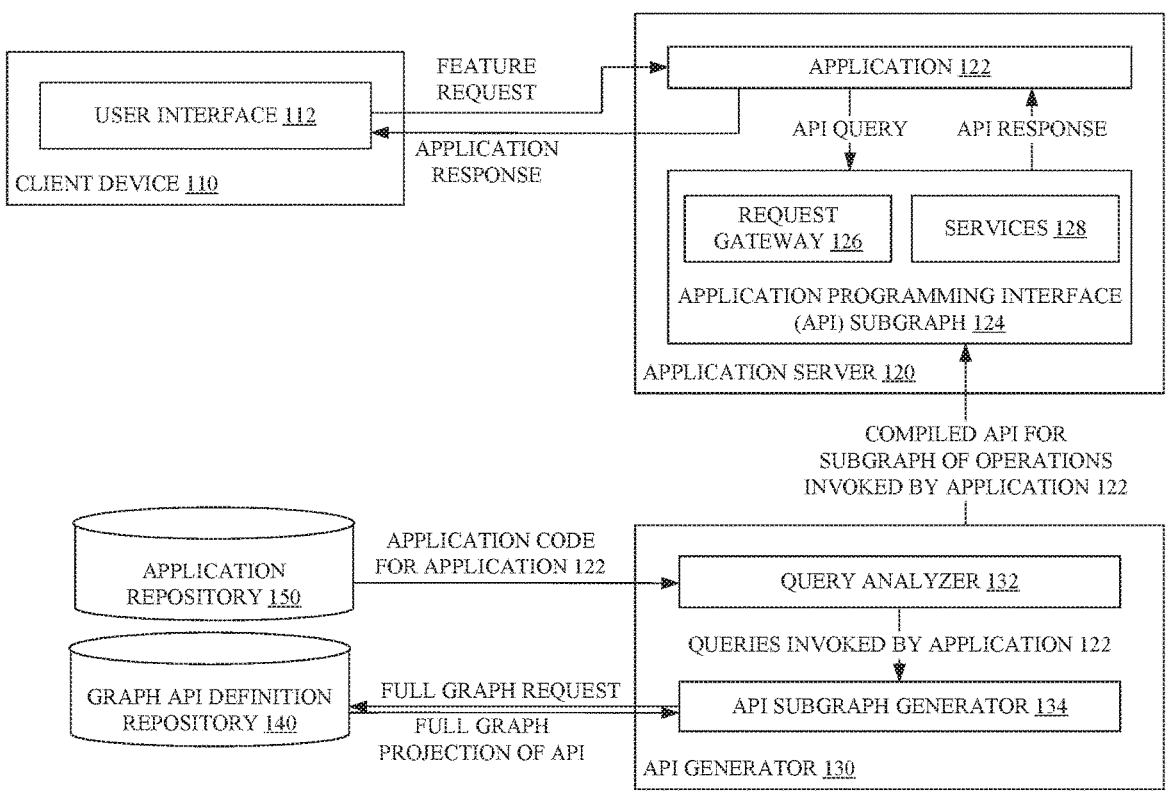
FIG. 1 depicts an example computing environment in which information about API calls invoked by an application is used to reduce a graph projection of an application programming interface (API) to a sub-graph projection of the API.

Application programming interfaces (APIs) for software architectures structured as a collection of services generally expose methods and procedures that software developers can use to build software applications using features provided by one or more of these services. Generally, each service in the collection of services may be built to implement a specific function or related set of functions in the API. By implementing separate services for specific functions or related sets of functions, the maintainability of an API may be improved, as updates to a function may affect the service that implements the updated function and may not affect other services that use the updated function.

While an API may expose features from various services, applications that use the API may only use some features exposed by some services in the API and may not use any features exposed by other services in the API. For example, an application that implements a payroll workflow may use time tracking, withholding calculation, and payment functions of an API, but may not need to use invoice generation functions exposed by the same API. In another example, an application that implements an invoicing workflow may not use the time tracking and withholding calculation functions of the API. However, because APIs are typically built so that the entirety of the API is exposed for use, compiling these APIs may take more time to complete and the compiled APIs may use more storage space than they would otherwise take if the APIs were tailored to the functions used by each application. The payroll workflow discussed above may thus, when deployed, include code for the invoice generation functions that are not used by the payroll workflow, and the invoicing workflow discussed above may include code for the time tracking and withholding calculation functions that are not used by the invoicing workflow.

APIs may expose functionality through various manners, including a graph projection of the API. The graph projection of the API may be stored, for example, as one or more schema files in a variety of schema languages, such as eXtensible Markup Language (XML), JavaScript Object Notation (JSON), Yet Another Markup Language (YAML), and the like. In a graph projection of an API, nodes in the graph projection of the API may represent operations that may be performed on a specific object, and connections between different objects may represent relationships where an operation represented by a node at an $n^{th}$ level in the graph projection depends on data from its parent node in the $n-1^{th}$ level in the graph projection. Functions may be defined as a navigable path of nodes in the graph from a root node representing a point of entry into the API to a specified node at any number of levels below the root node, which illustrates the dependency of the final operation on operations represented by nodes at higher levels of the graph projection. For any given application, the entirety of the graph projection of the API may include nodes representing functions that are invoked by the application, as well as nodes representing functions that are not invoked by the application.

Aspects of the present disclosure provide for the generation of a subgraph projection of an API and the code implementing functions included in the subgraph projection of the API based on queries generated or functions invoked by an application. By generating a subgraph projection of an API, and generating code to implement the subgraph projection of the API based on the queries generated or functions invoked by an application, an application may be built such that functionality relevant to the application is included in the API generated for the application. Meanwhile, functionality that is not relevant to the application is excluded from the API generated for the application. Because the subgraph projection of the API and the generated code generally represents a subset of the functionality exposed by the API, the code generated for the API may be smaller and may be compiled using fewer processing resources than code generated for the full graph projection of the API including functions not used by the application.

Example Generation of a Subgraph of an Application Programming Interface Based on Queries Invoked by an Application FIG. 1 illustrates an example computing environment 100 in which information about queries invoked by an application are used to generate a subgraph projection of an application programming interface (API) for the application.

As illustrated, computing environment 100 includes a client device 110, an application server 120, an API generator 130, a graph API definition repository 140, and application code repository 150. Computing environment 100 illustrates the generation and deployment of subgraph projections of an API in a client-server deployment where the subgraph projection of the API is deployed to an application server (e.g., 120) for use in an application accessed remotely by a client device (e.g., 110). It should be recognized, however, that the generation and deployment of subgraph projections of the API may be performed as part of an application compilation process for applications that are deployed as executable files to be installed on a client device, such as a desktop computer, laptop computer, tablet, or smartphone, to name a few examples.

Client device 110 generally hosts a user interface 112 that receives graphical user interface data from application server 120, including one or more fields for entering data to be processed by a software application executing on application server 120, and transmits the entered data to application server 120 for processing. Generally, a user may invoke a session of application 122 executing on application server 120 by providing, through user interface 112, user login credentials for the user's account to application server 120. Subsequently, a user may use various features provided by application 122, which may include generating a feature request through user interface 112. The feature request may identify a specific query or set of queries the user wishes to execute in application 122 and may be transmitted to application 122 via a network connection between client device 110 and application server 120. In response, user interface 112 may receive an application response from application 122, including a response to the feature request. The response to the feature request may include data requested from a storage repository or generated from data in a storage repository to be displayed to a user of client device 110 through user interface 112.

Application server 120 generally hosts various components of a software application (e.g., 122) and exposes these components for use by users of client device 110. As illustrated, application server 120 includes an application 122 and an application programming interface (API) 124. As discussed in further detail below, API 124 represents a subgraph projection of the full API generated for application 122.

Application 122 is generally representative of any application that may be hosted on an application server 120 for execution by one or more remote users interacting with the application 122 using a client device 110. Application 122 generally includes information about a plurality of queries that are invoked against API 124 during execution of application 122, as well as code that generates user interfaces for display on client device 110, performs calculations or other operations on data provided by a user, and the like. To perform an operation, application 122 may invoke one or more functions exposed by API 124 by specifying the function to be invoked and the data to be used by the function to be invoked. The specification of the function may be, for example, a graph query, a REST query, or other information that identifies the function to be invoked. In response, application 122 receives a response from API 124 including the result of the function that was invoked or an indication that the function failed to successfully execute and takes action based on the received response.

In some embodiments, application 122 may be an API explorer that allows developers of a software application to view information about the functions exposed by API 124. This information may include, for example, function names, required and optional inputs, and outputs generated by each function in API 124. In some embodiments, application 122 may receive a request to browse the functions exposed by API 124 from a user of client device 110. Based on information about the user, application 122 may request information about API 124 tailored to the requesting user from API generator 130. By tailoring the information about API 124 to the requesting user, the requesting user may receive information about a relevant subset of the API without receiving information about irrelevant portions of the API.

For example, where a user is a member of an organization that works on payroll-related applications, application 122 may request the generation of a subgraph of an API including the functions relevant to a payroll workflow, such as time tracking, withholding calculation, and payment functionality. By requesting generation of a subgraph of an API including functions relevant to a payroll, application 122 may obtain a subgraph of an API that excludes functions that are irrelevant to the payroll workflow.

In some embodiments, application 122 may generate profiles for different types of users of an API explorer to generate the appropriate subgraph of the API and provide the generated subgraph to a user for exploration. Users may be profiled, for example, based on information about the user's organization, user's search history, and other information that may be used in identifying relevant and irrelevant information for the user of application 122. Historical user search history may be used to identify common access patterns for different types of users. When a user initially accesses an API explorer and identifies an initial set of queries to explore, application 122 can examine the historical user search history to identify other relevant queries that the user may wish to explore and generate a subgraph of the API based on the identified initial set of functions and other relevant functions.

API 124 generally exposes functions used by application 122 to implement the functionality of application 122. As discussed in further detail below, API 124 may be generated by API generator 130 based on the queries or functions invoked by application 122. In some embodiments, API 124 may include a request gateway 126 that receives requests from application 122 and one or more services 128 implementing the functions used by application 122.

When an API request is generated by application 122 and received at the request gateway 126, API 124 can parse the request to identify whether the request is a valid request. For example, in a graph projection of an API, API 124 can determine whether the request is valid by determining whether the request specifies a continuous path through the graph projection of the API (i.e., the subgraph of the API generated based on the functions invoked by application 122) and whether required parameters for the request, as identified in the subgraph projection of the API, are included in the request. If the request is a valid request and any required parameters are included in the request, API 124 can execute the request using the one or more services 128 and return the result of the request to application 122. Otherwise, API 124 can generate an error message indicating that the request was invalid. The one or more services 128 may be, for example, a service or microservice that implements a function used by application 122 and may be deployed on application server 120 and/or one or more compute instances in a cloud computing environment.

API generator 130 generally uses information about application 122 and a full graph projection of an API to generate a subgraph projection of the API for application 122. As discussed, by generating a subgraph projection of the API tailored to the functions invoked by application 122, the subgraph projection of the API generated and compiled for the application may be smaller than the full API. Because the subgraph projection of the API includes a subset of the functions included in the full graph projection of the API, code implementing the subgraph projection of the API may be generated with a smaller size than that of the full graph projection of the API, and compiling the code implementing the subgraph projection of the API may take less time than compiling code implementing the full graph projection of the API.

As illustrated, API generator 130 includes a query analyzer 132 and an API subgraph generator 134. Query analyzer 132 generally receives information about an application that invokes functions related to objects in the full graph projection of the API and identifies the functions invoked by the application, which may be a subset of the functions related to objects exposed by the full graph projection of the API. In some embodiments, query analyzer 132 may receive source code for application 122 from application repository 150 or directly from application server 120. Query analyzer 132 then parses through the source code for application 122 to identify a set of queries or function calls that reference the API. In some embodiments, where the API includes a set of overloaded functions (i.e., functions having the same name but using different input and/or output parameters), query analyzer 132 can use information about the data types of the input and/or output parameters to identify the correct version of the overloaded function invoked by the application 122.

Query analyzer 132 may parse through the source code for application 122 using regular expression searching, searching for entries in a dictionary of API function calls that are included in the source code for application 122, or using other textual search techniques that may be used to identify queries or API function calls from other operations in the source code for application 122. In some embodiments, where the source code for application 122 is obfuscated (e.g., rewritten using code obfuscation tools that obscure the operations performed by application 122), query analyzer 132 can de-obfuscate the source code prior to identifying the functions invoked by the application.

In some embodiments, query analyzer 132 parses the information about queries invoked by an application into an abstract syntax tree that records data types, objects, and object properties referenced in queries in the application. For each object property referenced in a query, query analyzer 132 can use the definition of the object to identify the data types that are to be included in the subgraph projection of the API. The definition of the object may be a schema definition defining the object and the object properties, and query analyzer 132 can parse the definition of the object to identify the data types and properties referenced by queries in the application 122.

In some embodiments, application 122 may be an API explorer that allows users to explore the functions exposed by the API. Because different users may work with different portions of the API, application 122 may be configured to expose different subgraphs of the full graph projection of the API to these users based on the functions commonly explored by similar users.

Generally, query analyzer 132 may receive, from application 122, information about the user that is exploring the API. This information may include, for example, organizational-level information, user type information, and other information that may be used to identify portions of the graph projection of the full API that are relevant to that user. The portions of the graph projection of the full API that are relevant to the user may be provided to API subgraph generator 134. As discussed, API subgraph generator 134 generates the subgraph projection of the API and compiles the code implementing the subgraph projection of the API. The resulting generated subgraph projection of the API may be displayed to the user in the API explorer.

In some embodiments, query analyzer 132 may receive, from application 122, a user selection of an initial query to explore in the API explorer. Based on the initial query, query analyzer 132 can identify, from historical usage patterns, other queries that may be relevant to the user and provide the identified queries and initial query to API subgraph generator 134 for use in generating the subgraph projection of the API.

API subgraph generator 134 generally uses the information about the set of queries invoked by an application 122 to traverse the full graph projection of the API and generate a subgraph projection of the API. API subgraph generator 134 may retrieve the full graph projection of the API from graph API definition repository 140, which serves as a repository in which the full graph projection of the API may be maintained as a master source from which subgraph projections of the API may be generated. The subgraph projection of the API generally includes nodes traversed in the full graph projection of the API by each query in the set of queries invoked by the application and excluding nodes not traversed in the full graph projection of the API by any of the queries in the set of queries invoked by the application. For each query in the set of queries, API subgraph generator 134 can identify each node specified in a navigable path through the full graph projection of the API and include information identifying each node in the navigable path in a list of visited nodes. In some embodiments, API subgraph generator 134 may maintain a list of each node visited by queries in the set of queries, such as an adjacency list, and, for each node in the list, maintain a counter of the number of times the respective node is visited and a list of nodes that connect to the respective node. As discussed in further detail below, the adjacency list may be used to truncate a generated subgraph of the API.

In some embodiments, API subgraph generator 134 may generate the subgraph of the API as a spanning tree including each of the nodes included in or referenced by navigable paths through the full graph projection of the API. In some embodiments, where the subgraph represents relationships between objects referenced by queries invoked by an application, the generated subgraph may be generated such that a minimal number of edges connect the nodes representing various objects in the generated subgraph.

In some embodiments, API subgraph generator 134 may further process the generated subgraph projection of the API according to various other parameters. For example, a maximum traversal depth may be defined for generating the subgraph projection of the API. The maximum traversal depth may be a user-defined value that specifies a maximum depth of a subgraph generated by API subgraph generator 134, and the maximum traversal depth may be defined globally (e.g., for all nodes in the graph projection of the API) or on a per-object basis such that API subgraph generator 134 is able to add a varying number of nodes below any given object. Generally, these nodes may represent objects that are indirectly referenced by the given object. Nodes below the defined maximum traversal depth may be truncated from the subgraph projection of the API or not added to the subgraph projection of the API such that no node in the subgraph projection of the API has a navigable path from the root node of the subgraph that exceeds the defined maximum traversal depth. Various traversal mechanisms may be used to add nodes to the subgraph so that indirect references to objects not discovered by query analyzer 132 can be discovered and added to the generated subgraph projection of the API. In some embodiments, the maximum traversal depth may be used in a breadth-first search from any given data type referenced by a query in application 122, in which neighboring nodes at the same level of a graph are discovered prior to finding nodes at a lower level. In some embodiments, a depth-first search from any given data type referenced by a query in application 122 may be used to discover additional nodes such that lower-level nodes are discovered prior to higher-level nodes during the traversal process.

In some embodiments, API subgraph generator 134 may be configured to terminate a subgraph based on the existence of a priori defined nodes in the subgraph. These a priori defined nodes may be nodes identified by a user or developer of an API as nodes in the API that are commonly referenced by a plurality of known queries and connect large subgraphs. In generating the subgraph projection of the API, API subgraph generator 134 may terminate traversal of the graph projection of the API for any given query in the set of queries invoked by application 122 when API subgraph generator 134 reaches one of these a prior defined nodes. In some embodiments, a developer may override the termination of a traversal operation for a query to allow additional nodes below the a priori defined nodes to be included in the subgraph projection of the API.

In some embodiments, API subgraph generator 134 can truncate the subgraph projection of the API to result in a closed subgraph projection that does not refer to nodes associated with data types or objects not included in the subgraph projection of the API. To truncate the subgraph projection of the API, API subgraph generator 134 can identify, for each node in the subgraph projection, whether a node representing a type reference is included in the subgraph projection. If a node representing the type reference is not included in the subgraph projection, the type reference may be replaced in the subgraph projection with a leaf type, which may be a reference to a type that does not include any further type references. By replacing type references with leaf types, the subgraph projection of the API may exclude large graphs of types or other nodes that are not needed by the application 122.

In some embodiments, API subgraph generator 134 generates and compiles code implementing the subgraph projection of the API for application 122. The generated and compiled code may include an API request gateway that allows the API to receive requests from an application 122 and dispatch the received requests to the appropriate services for processing these requests. These services may be included in code generated for the subgraph projection of the API or in references to remote services that implement functions exposed by the subgraph projection of the API.

Figure 2:
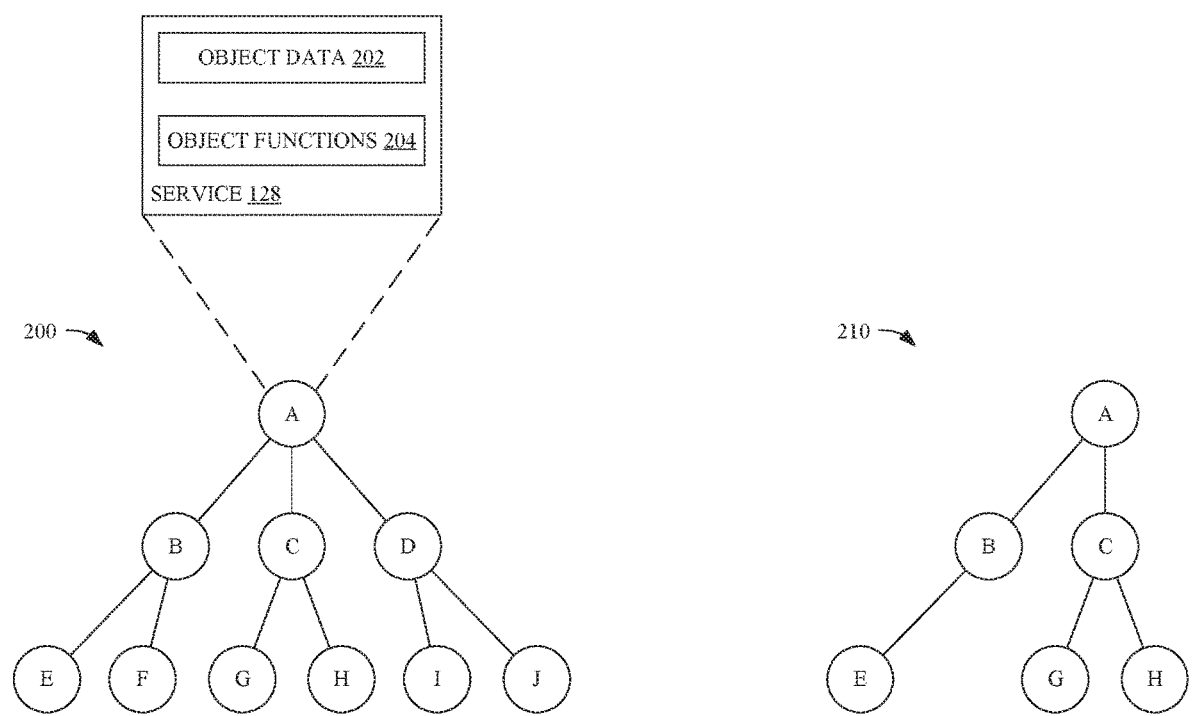
FIG. 2 illustrates an example graph projection of an API and an example sub-graph projection of the API.

Example Subgraph Projection of an Application Programming Interface Generated from a Full Graph Projection of the Application Programming Interface FIG. 2 illustrates a full graph projection of an API 200 and a subgraph projection of an API 210 generated from the full graph projection 200 and information about queries invoked by an application.

As illustrated, full graph projection 200 includes ten nodes, A through J, which represents objects defined in the API. As illustrated, object A represents a root object and references objects B, C, and D. Object B references objects E and F, object C references objects G and H, and object D references objects I and J. Each node generally represents an object that may be implemented by a service 128 illustrated in FIG. 1. Service 128 includes object data 202 and object functions 204. Object data 202 may be data used by object functions 204 to perform specified operations exposed by the object, and may include data specified as programming primitives (e.g., integers, floating point numbers, strings, Booleans, etc.) or other objects (e.g., objects supported by a programming language, such as lists, queues, stacks, and/or other language-implemented constructs, or custom objects represented by other nodes in the full graph projection 200 and/or subgraph projection 210). Object functions may perform various operations against the object data 202 and may include public functions that may be invoked by application 122 and private functions invoked within the object itself.

Assume that an application generates queries that reference objects A, B, C, E, G, and H. The other objects in the full graph projection 200 may be unnecessary for the application to execute, and thus need not be included in the subgraph projection 210 generated from the full graph projection 200 and the information about queries invoked by the application. Thus, the subgraph projection may be generated with nodes representing objects A, B, C, E, G, and H, and excluding nodes F, D, I, and J (i.e., the objects in the full graph projection 200 that are not referenced by queries in the application for which the subgraph projection 210 is being generated).

While not illustrated in FIG. 2, in some embodiments, such as those involving larger full graph projections of an API, additional nodes may be discovered using various graph traversal techniques and added to the subgraph projection 210. Some nodes may be added based on a breadth-first search of nodes in the full graph projection 200 to a specified traversal depth from any node included in subgraph projection 210. Other nodes may be added as leaf nodes that do not include references to any other objects (e.g., includes the null set for a specification of references to other objects) to terminate subgraph projection 210.

Figure 3:
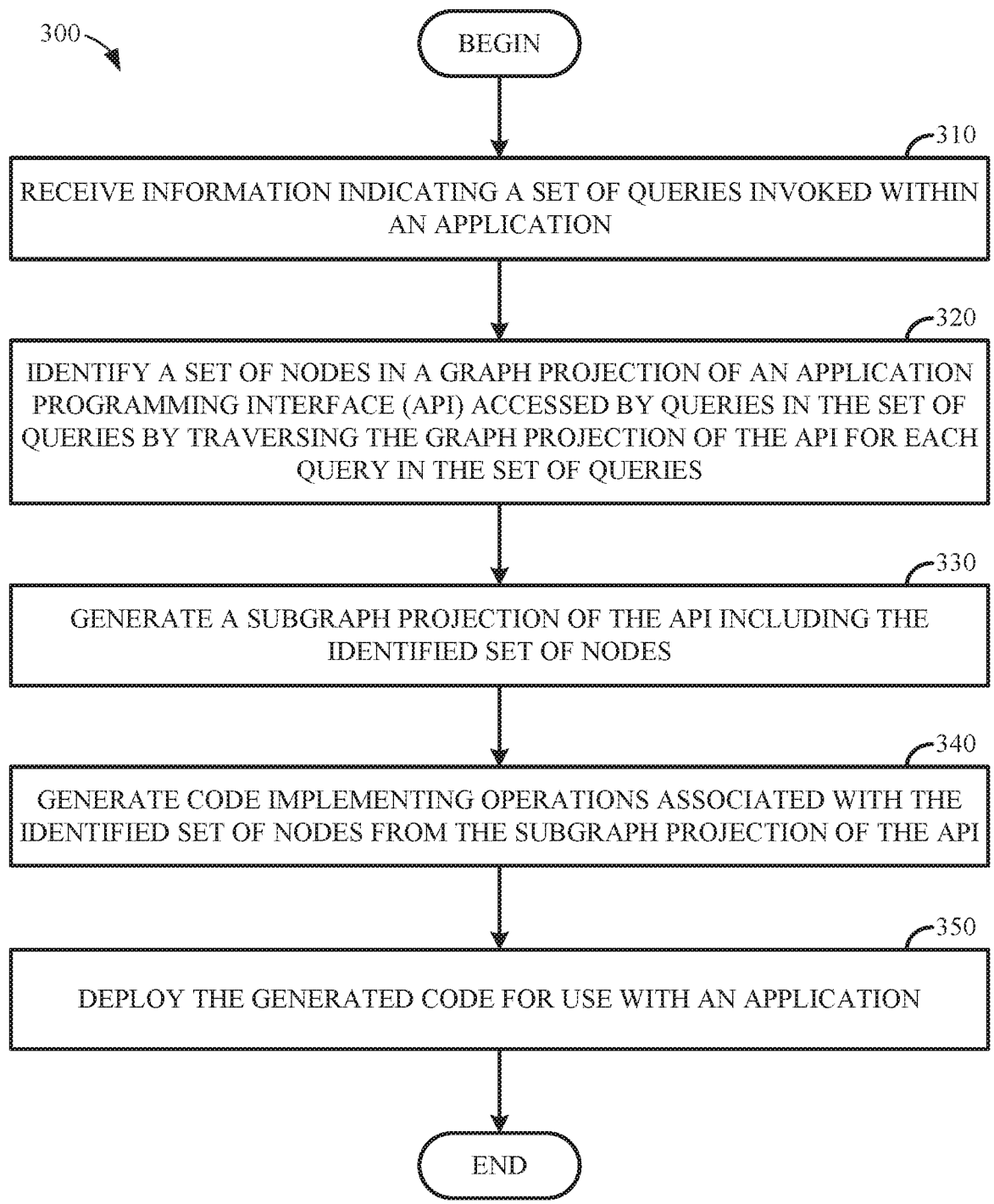
FIG. 3 illustrates example operations for generating a sub-graph projection of an API based on information about API calls invoked by an application and a graph projection of the API.

Example Computer-Implemented Method for Generating Subgraphs of an Application Programming Interface Based on Queries Invoked by an Application FIG. 3 illustrates example operations 300 for generating a subgraph of an application programming interface (API) based on information about queries invoked by an application. The operations described herein may be performed at an API generator (e.g., API generator 130 illustrated in FIG. 1) or on a computing device on which application code is compiled and built into a deployable executable file.

As illustrated, operations 300 begin at block 310, where a system receives information indicating a set of queries in the graph projection of the API invoked by an application. In some embodiments, the information may be application source code that defines the functionality of the application and the interactions between the application and other resources, such as API queries executed against remote or local services.

To generate the set of queries invoked by the application, the system can parse the application source code using various text recognition methods. For example, the system can use regular expression or pattern matching to identify strings in the application source code that are likely to represent API queries invoked by the application. For queries invoked against a RESTful API, the regular expression or pattern matching system can identify uniform resource locators (URLs) having parameter strings following a special character (e.g., the "?" character) and individual parameters in the parameter string being separated by another special character (e.g., the "&" character). In another example, for queries invoked against a GraphQL API using a URL, the regular expression or pattern matching system can identify URLs or other strings that identify nodes and node parameters, with each node and/or node parameter being separated by a special character (e.g., the "/" character). In still another example, for queries invoked using JavaScript Object Notation (JSON), the regular expression or pattern matching system can identify strings in the application source code that match a predefined format for the JSON requests used to execute a query exposed by the API.

In some embodiments, the information indicating a set of queries invoked within an application may include information about a user interacting with the application. To generate the set of queries invoked within the application, the system can use the information about the user to determine the type of the user or otherwise identify similar users. The information about the user may include, for example, user organization, product subscriptions, information about portions of an application that the user is exploring or otherwise building extensions for, and other information that may be used to identify relevant information within the API. In some embodiments, the information about the user may include a search history of API queries viewed by the user, which the system can use to identify other relevant queries to include in the set of queries based on historical usage patterns of other users who have viewed the queries in the user's search history.

At block 320, the system identifies a set of nodes in a graph projection of an API accessed by queries in the set of queries. To do so, the system can traverse the graph projection of the API for each query in the set of queries. While traversing the graph projection of the API, the system can identify objects and object properties referenced by each node accessed in the graph projection of the API. Using the identified objects and object properties, the system can generate a set of objects discovered while traversing the graph projection of the API, with each object representing a node in the graph projection of the API that may be included in the subgraph projection of the API.

At block 330, the system generates a subgraph projection of the API including the identified set of nodes. Generally, the subgraph projection of the API may be generated as a minimum spanning tree including at least some of the identified set of nodes. The nodes included in the subgraph projection of the API may include nodes identified a priori as types that are most often included in a path between any pair of types in the graph projection of the API and other nodes that represent origin nodes and nodes discovered using a depth-first traversal from the a priori identified nodes (if any) included in the subgraph projection. In some embodiments, the subgraph projection may be truncated to remove certain nodes that represent missing objects in the subgraph by replacing these nodes with terminating nodes that do not include references to other objects or data types. These missing objects generally include objects that may be referenced recursively by another object in the subgraph but is not included in the subgraph. By removing nodes representing missing objects and replacing nodes representing missing objects with terminating nodes, recursive references may be eliminated, which may exclude portions of the full graph that are not needed by an application from being included in the generated subgraph.

At block 340, the system generates code implementing functions associated with the identified set of nodes from the subgraph projection of the API. The generated code may include code implementing a request gateway that serves as a point of entry into the subgraph projection of the API for applications to invoke queries using the API and code that processes requests received from an application.

At block 350, the system deploys the generated code for use with an application. The generated and compiled code may be deployed as scripts or executables on an application server for use by applications executing on the application server or on another remote application server. In some embodiments, for applications that are deployed as executable files on a client device, the generated code may be deployed as executable code that can be integrated into the application or libraries to be installed and registered on the client device for use with the application. Generally, the generated and compiled code may be used as a set of one or more libraries or API services that reside outside of the codebase of the application. During execution of the application, the application may invoke the functions exposed by the generated and compiled code (e.g., using various remote procedure call operations) in order to execute one or more functions in the application.

In some embodiments, receiving information indicating the set of queries invoked within the application includes receiving source code implementing the application. The source code may be parsed to identify the set of queries executed within the application.

In some embodiments, receiving information indicating the set of queries invoked within the application includes receiving a request to view information about the API from a user. The type of the user may be determined, and based on the determined type of the user, queries commonly invoked by other users of the determined type of user may be identified.

In some embodiments, the system can generate the subgraph projection of the API by building a spanning tree from the graph projection of the API including the identified set of nodes in the graph projection of the API.

In some embodiments, the system can generate the subgraph projection of the API based on a maximum traversal depth identifying a maximum number of nodes below an identified node in the graph projection of the API to traverse.

In some embodiments, the system identifies the set of nodes in the graph projection of the API comprises traversing the graph projection of the API until one or more predefined nodes are reached. These predefined nodes may include nodes in the graph projection of the API that are reached by a plurality of queries.

In some embodiments, the system may generate an adjacency list from the generated subgraph. The generated subgraph may be truncated based on a number of adjacent nodes for each node in the identified set of nodes such that each node in the generated subgraph is adjacent to a threshold number of nodes. Generally, nodes that are adjacent nodes may be nodes for which an edge between the nodes exists in a graph.

In some embodiments, the generated code may include device-specific code including an interface for executing graph query requests over hypertext transfer protocol (HTTP). The device-specific code may be code written for specific hardware platforms or operating environments in which an application for which the generated code is built operates. The generated code may include data validation code based on data types and data constraints identified in the nodes of the generated subgraph. The data validation code may be used in initial processing of a received request to ensure that a query invoked by an application can be successfully executed based on the inputs provided in a request to invoke the query. If the data validation code indicates that the inputs provided in the request are in the proper format, the query may be executed. Otherwise, the subgraph projection of the API may return an error message indicating why the query was unable to be invoked or otherwise fail in a manner that does not cause the application from abruptly failing.

Figure 4:
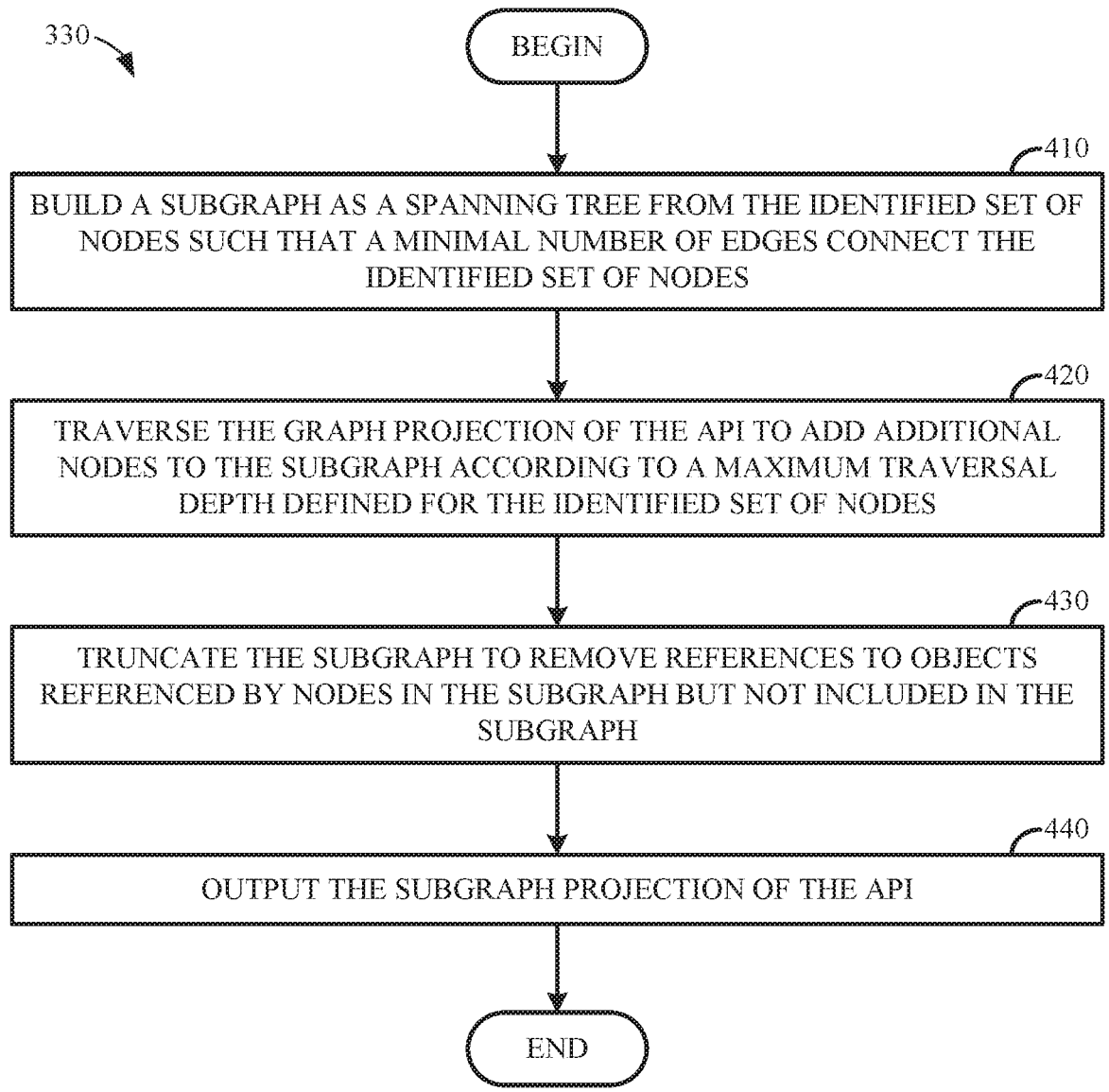
FIG. 4 illustrates example operations for identifying nodes to include in the sub-graph projection of an API.

Example Operations for Generating Subgraphs of an Application Programming Interface from a Graph Projection of the Application Programming Interface and Queries Invoked by an Application FIG. 4 illustrates further details regarding operations 330 (illustrated in FIG. 3) for generating the subgraph projection of the API including the identified set of nodes.

As illustrated, operations 330 begin at block 410, where a system builds a subgraph projection of the API as a spanning tree from the identified set of nodes. The subgraph projection of the API may be built such that the identified set of nodes are connected using a minimal number of edges. Generally, the identified set of nodes may include nodes representing objects referenced in application source code and nodes representing objects that are known a priori to be included in a set of paths between pairs of objects in the graph projection of the API.

At block 420, the system traverses the graph projection of the API to add additional nodes to the subgraph according to a maximum traversal depth defined for nodes in the subgraph. Generally, traversing the graph projection of the API according to a maximum traversal depth for nodes in the subgraph allows for indirect references to objects in the subgraph to be resolved and added to the subgraph projection of the API. The maximum traversal depth may be defined on a per-node (i.e., per-object or per-data-type) basis such that different nodes may have different maximum traversal depths or on a global basis such that each node has the same maximum traversal depth for adding additional nodes to the subgraph. In traversing the graph projection of the API, the node in the graph projection of the API being analyzed may be designated as the root node of a search. A breadth-first search may be performed from the node to identify nodes to include in the subgraph up to the maximum traversal depth below the node.

At block 430, the system truncates the subgraph projection of the API to remove references to objects not included in the subgraph projection of the API. To truncate the subgraph projection of the API, the system can examine references to other objects or data types included in each node of the subgraph projection of the API. If a node representing an object references another object that is not represented by a node in the subgraph, the referenced object may be removed from the subgraph and replaced with a terminating node. The terminating node may be a node that does not include any references to other objects in the subgraph so that unneeded objects are not included in the subgraph projection of the API.

At block 440, the system outputs the generated subgraph projection of the API. As discussed, the generated subgraph projection of the API may be deployed to an application server for use with an application, compiled into one or more libraries deployed with an application executable, or otherwise used in conjunction with an application in lieu of a larger, global API that includes queries that are not invoked by the application.

Figure 5:
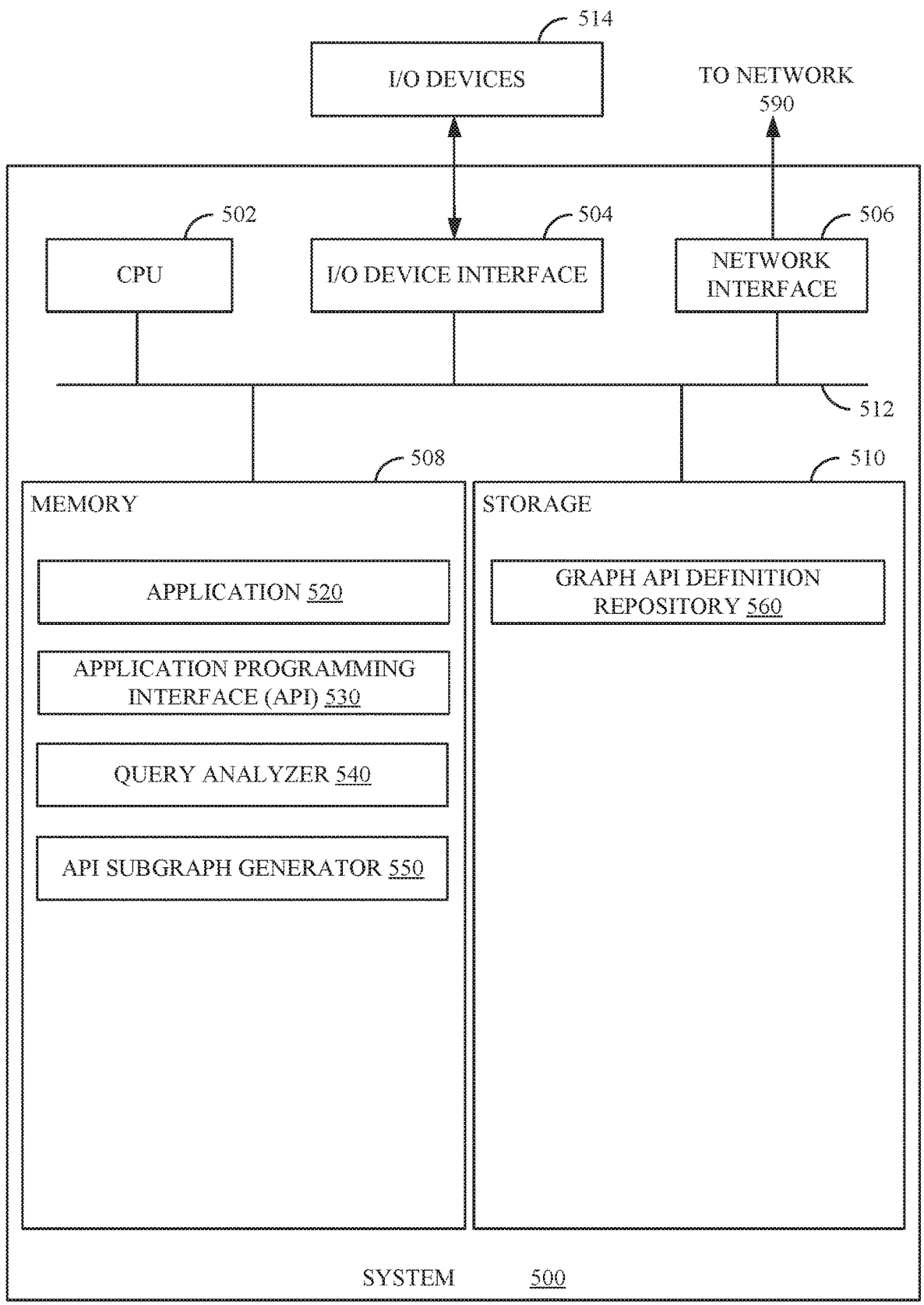
FIG. 5 illustrates an example system on which embodiments of the present disclosure can be performed.

Example System for Generation of a Subgraph of an Application Programming Interface Based on Queries Invoked by an Application FIG. 5 illustrates an example system 500 that can generate a subgraph projection of an API from a full graph projection of the API and information about queries invoked by an application using the API. For example, system 500 may comprise one or both of application server 120 and/or API generator 130 illustrated in FIG. 1 and may perform the operations illustrated in FIGS. 2 and 3.

As shown, system 500 includes a central processing unit (CPU) 502, one or more I/O device interfaces 504 that may allow for the connection of various I/O devices 516 (e.g., keyboards, displays, mouse devices, pen input, etc.) to the system 500, network interface 506 through which system 500 is connected to network 590 (which may be a local network, an intranet, the internet, or any other group of computing devices communicatively connected to each other), a memory 508, storage 510, and an interconnect 512.

CPU 502 may retrieve and execute programming instructions stored in the memory 508. Similarly, the CPU 502 may retrieve and store application data residing in the memory 508. The interconnect 512 transmits programming instructions and application data, among the CPU 502, I/O device interface 504, network interface 506, memory 508, and storage 510.

CPU 502 is included to be representative of a single CPU, multiple CPUs, a single CPU having multiple processing cores, and the like.

Memory 508 is representative of a volatile memory, such as a random access memory, or a nonvolatile memory, such as nonvolatile random access memory, phase change random access memory, or the like. As shown, memory 508 includes an application 520, application programming interface (API) 530, query analyzer 540, and API subgraph generator 550.

Application 520 generally is representative of executable code operating on system 500 that invokes one or more queries in an API and for which a subgraph projection of the API is generated by API subgraph generator 550. During execution, application 520 may generate queries against API 530 according to a defined access mechanism for requesting that API 530 generate a response to a query, such as generating and transmitting REST requests, GraphQL requests as a URL or a JSON payload, and the like. Application 520 may receive a response from API 530, perform additional processing on the data included in the response and user-provided data, and output results of the additional processing for display to a user on a device connected to system 500 via I/O device interface 504 and/or network interface 506.

API 530 generally is representative of a subgraph projection of an API generated by API subgraph generator 550 from a full graph projection of the API. API 530 may include a request gateway that is configured to receive requests (e.g., queries, function calls, etc.) from application 520 and/or applications executing on a remote system via network interface 506. API 530 may also include implementations of services exposed by the API and/or routing mechanisms for routing received requests to the appropriate service for execution. When API 530 receives a request, API 530 generally executes portions of the request locally and routes portions of the request to other services for execution in order to generate a result, and the result may be provided to the requesting application in response to the request.

Query analyzer 540 generally uses information about an application invoking functionality of an API to identify the set of queries from which the subgraph projection of the API is created by API subgraph generator 550. In some embodiments, query analyzer 540 can retrieve the source code defining application 520 for analysis, deobfuscate the source code if necessary, and parse the source code using various pattern matching, dictionary matching, or regular expression matching mechanisms to identify a set of queries invoked by the application 520. In some embodiments, where an application provides an API explorer, the information about the application may include information about the user attempting to explore the functionality exposed by the API. Using information about similar users and/or similar search histories, query analyzer 540 can generate a set of queries that are likely to be of interest to the user. The generated set of queries may be used to identify a set of nodes in the graph projection of the API from which the subgraph projection of the API may be built.

API subgraph generator 550 generally uses information about the set of queries invoked by an application to build a subgraph projection of the API that includes nodes relevant to the application and excludes nodes irrelevant to the application, thereby reducing the size of the API generated and deployed for any given application. To generate a subgraph projection of an API, API subgraph generator 550 uses a set of nodes identified from the set of queries to generate a spanning tree representing relationships between the set of nodes. API subgraph generator 550 may add other nodes to the spanning tree up to a maximum tree traversal depth and may add nodes with null pointers to references not included in the subgraph as terminating nodes of the graph. Using the subgraph projection, API subgraph generator 550 may generate code implementing the subgraph projection of the API and may deploy the subgraph projection of the API for use with application 520 and other applications hosted locally on system 500 and/or remotely via network interface 506.

Storage 510 is representative of a non-volatile memory, such as a disk drive, solid state drive, or a collection of storage devices distributed across multiple storage systems. Although shown as a single unit, the storage 510 may be a combination of fixed and/or removable storage devices, such as fixed disc drives, removable memory cards or optical storage, network attached storage (NAS), or a storage area-network (SAN). Storage 510, as illustrated, may include a graph API definition repository 560. Graph API definition repository 560 generally provides a storage repository in which a full graph projection of an API may be stored for use in generating the subgraph projection of the API relevant to application 520. In some embodiments, the full graph projection of the API stored in graph API definition repository 560 may include a graph and one or more schema files defining the properties of each object referenced by a query supported by the graph projection of the API. The information in the schema files and the full graph projection of the API may be used by API subgraph generator 550 to identify nodes that may be included and excluded in the subgraph projection of the API for an application 520, as discussed above.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for generating application programming interface (API) code for an application, comprising:
   receiving information indicating a set of queries invoked within an application;
   identifying a set of nodes in a graph projection of an API accessed by queries in the set of queries by traversing the graph projection of the API for each query in the set of queries;
   generating a subgraph projection of the API including the identified set of nodes and edges connecting the identified set of nodes discovered by traversing the graph projection of the API for each query in the set of queries;
   generating code implementing operations associated with the identified set of nodes from the generated subgraph projection of the API; and
   deploying the generated code for use with the application.

2. The method of claim 1, wherein receiving information indicating the set of queries invoked within the application comprises:
   receiving source code implementing the application; and
   parsing the source code to identify the set of queries invoked within the application.

3. The method of claim 1, wherein:
   the application comprises an API explorer; and
   receiving information indicating the set of queries invoked within the application comprises:
      receiving a request to view information about the API from a user within the API explorer, wherein the request causes the API explorer to invoke a specified query in the API;
      determining a type of the user; and
      based on the determined type of user, identifying queries commonly invoked within the API explorer by other users of the determined type of user.

4. The method of claim 1, wherein generating the subgraph projection of the API comprises: building a spanning tree from the graph projection of the API including the identified set of nodes in the graph projection of the API.

5. The method of claim 1, wherein the subgraph projection of the API is generated based on a maximum traversal depth identifying a maximum number of nodes below an identified node in the graph projection of the API to traverse.

6. The method of claim 1, wherein:
   identifying the set of nodes in the graph projection of the API comprises traversing the graph projection of the API until one or more predefined nodes are reached, and
   the one or more predefined nodes comprise nodes in the graph projection of the API that are reached by a plurality of queries.

7. The method of claim 1, further comprising:
   generating an adjacency list from the generated subgraph; and
   truncating the generated subgraph based on a number of adjacent nodes for each node in the identified set of nodes such that each node in the generated subgraph is adjacent to a threshold number of nodes.

8. The method of claim 1, wherein the generated code comprises device-specific code including an interface for executing graph query requests over hypertext transfer protocol (HTTP).

9. The method of claim 1, wherein the generated code includes data validation code based on data types and data constraints identified in the nodes of the generated subgraph.

10. A system, comprising:
    a processor; and
    a memory having instructions stored thereon which, when executed by the processor, performs an operation for generating application programming interface (API) code for an application, the operation comprising:
       receiving information indicating a set of queries invoked within an application;
       identifying a set of nodes in a graph projection of an API accessed by queries in the set of queries by traversing the graph projection of the API for each query in the set of queries;
       generating a subgraph projection of the API including the identified set of nodes and edges connecting the identified set of nodes discovered by traversing the graph projection of the API for each query in the set of queries;

generating code implementing operations associated with the identified set of nodes from the generated subgraph projection of the API; and deploying the generated code for use with the application.

11. The system of claim 10, wherein receiving information indicating the set of queries invoked within the application comprises:

receiving source code implementing the application; and parsing the source code to identify the set of queries invoked within the application.

12. The system of claim 10, wherein:

the application comprises an API explorer; and receiving information indicating the set of queries invoked within the application comprises:

receiving a request to view information about the API from a user within the API explorer, wherein the request causes the API explorer to invoke a specified query in the API;

determining a type of the user; and based on the determined type of user, identifying queries commonly invoked within the API explorer by other users of the determined type of user.

13. The system of claim 10, wherein generating the subgraph projection of the API comprises: building a spanning tree from the graph projection of the API including the identified set of nodes in the graph projection of the API.

14. The system of claim 10, wherein the subgraph projection of the API is generated based on a maximum traversal depth identifying a maximum number of nodes below an identified node in the graph projection of the API to traverse.

15. The system of claim 10, wherein:

identifying the set of nodes in the graph projection of the API comprises traversing the graph projection of the API until one or more predefined nodes are reached, and the one or more predefined nodes comprise nodes in the graph projection of the API that are reached by a plurality of queries.

16. The system of claim 10, wherein the operation further comprises:

generating an adjacency list from the generated subgraph; and truncating the generated subgraph based on a number of adjacent nodes for each node in the identified set of nodes such that each node in the generated subgraph is adjacent to a threshold number of nodes.

17. The system of claim 10, wherein the generated code comprises device-specific code including an interface for executing graph query requests over hypertext transfer protocol (HTTP).

18. The system of claim 10, wherein the generated code includes data validation code based on data types and data constraints identified in the nodes of the generated subgraph.

19. A method for generating application programming interface (API) code for an application, comprising:

receiving information indicating a set of queries invoked within an application;

identifying a set of nodes in a graph projection of an API accessed by queries in the set of queries by traversing the graph projection of the API for each query in the set of queries;

generating a subgraph projection of the API including the identified set of nodes and edges connecting the identified set of nodes discovered by traversing the graph projection of the API for each query in the set of queries by:

building a subgraph as a spanning tree from the identified set of nodes, traversing the graph projection of the API to add additional nodes to the subgraph according to a maximum traversal depth from each of the identified nodes, and truncating the subgraph to remove references to objects referenced by nodes in the subgraph but not included in the subgraph;

generating code implementing operations associated with the identified set of nodes from the generated subgraph projection of the API; and deploying the generated code for use with the application.

20. The method of claim 19, wherein:

identifying the set of nodes in the graph projection of the API comprises traversing the graph projection of the API until one or more predefined nodes are reached, and the one or more predefined nodes comprise nodes in the graph projection of the API that are reached by a plurality of queries.

* * * * *